March 5, 1963  W. G. RATHMANN  3,080,124
SOAKER
Filed Oct. 24, 1960
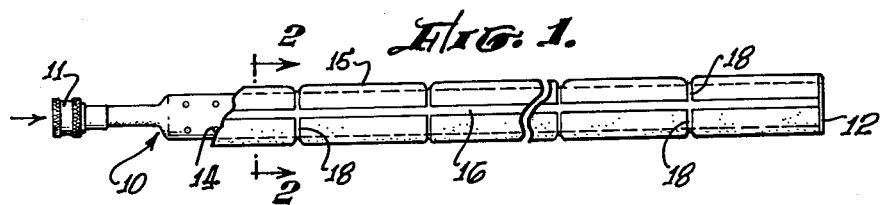
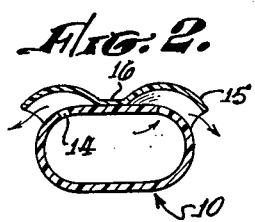
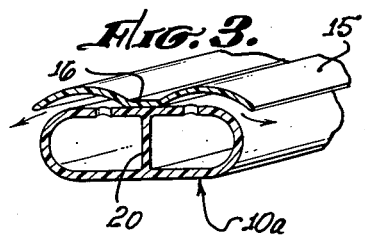
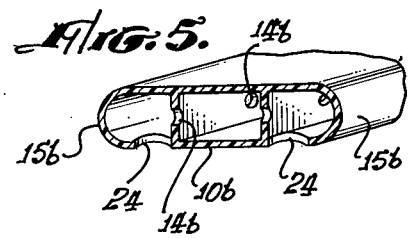
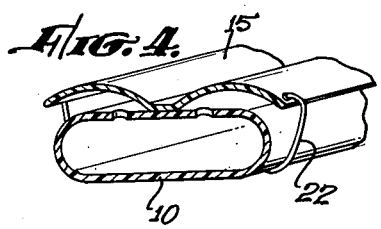
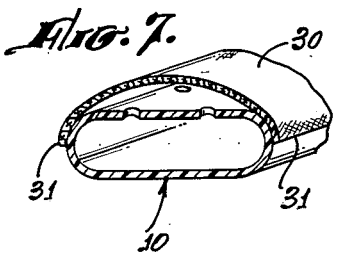
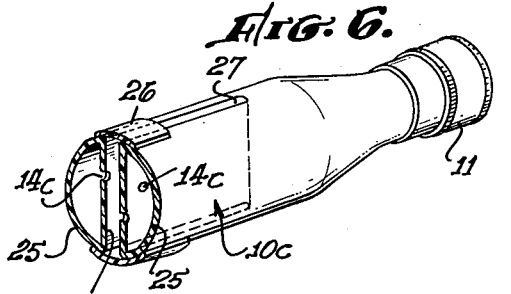
WILLIAM G. RATHMANN,
INVENTOR.
BY
ATTORNEYS.

United States Patent Office

3,080,124
Patented Mar. 5, 1963

3,080,124
SOAKER
William G. Rathmann, Los Angeles, Calif.
(8475 Van Ness Ave., Inglewood, Calif.)
Filed Oct. 24, 1960, Ser. No. 64,511
2 Claims. (Cl. 239—450)

The present invention relates generally to irrigation devices, and especially to such devices as are adapted to irrigate only a limited area, such a flower bed, a planting box, or the like. Devices of this type are generally referred to as soakers since they deliver water at a low rate and are adapted to be left in operation for a long time.

There are many types of sprinkling devices for domestic use but generally they are designed to cover as much area as possible in order to reduce the number of times that they have to be set in order to cover a given area. This is particularly true in the case of lawn sprinklers. This characteristic is also true in general of sprinklers which consist of a length of plastic tubing with holes in the wall thereof. Sprinklers having this characteristic are unsuited to watering limited areas, such as a flower bed or a planting box, where it is desired for various reasons not to have any water delivered to areas beyond the particular area to be irrigated.

One example of the situation in which it is desired to confine the area of water to a well defined limit is a flower bed or box adjoining a walk along which people are passing so that no water should be delivered to the walk. Another situation in which limited watering is desired is the case of plants having leaves or blossoms which should not be wet. A similar situation exists with relation to an interior flower box or planter where care must be exercised to avoid spraying water on surrounding walls or floors.

Limited areas of this character are generally long and narrow and irrigation of them is greatly facilitated by having the sprinkler flexible so that it can conform to the shape of the area to be irrigated or can be bent to deliver water to plants in an irregular pattern.

Thus it becomes a general object of my invention to provide an irrigating device adapted to deliver water to a well-defined area of relatively limited size, and particularly such an area which is elongated in its shape.

It is a further object of my invention to provide an irrigating device which is of a flexible nature so that it can be readily adapted to the shape or outline of the area to be irrigated or to an irregular pattern in which the plants may be placed.

A further object of the invention is to provide an irrigating device of this character which is adapted to a low rate of delivery but which also distritributes the water more or less uniformly along its entire length.

These objects of my invention are accomplished by providing a tubular member which is open at one end to receive water from a suitable source and has discharge openings in the wall of the tubular member through which a stream of water issues. On the exterior of the tubular member is mounted a baffle means which is so located as to intercept the streams of water which is issuing through said discharge openings and thereby cause the water to run down off the baffle means to reach the ground in the immediate vicinity of the tubular member. The baffle also acts to distribute the water to some extent along the length of the tubular member.

Both the tubular member and the baffle means may assume various configurations. In a typical embodiment the tubular member is a simple tube of plastic material having a number of discharge openings located at short intervals along its length. The baffle means is a sheet of similar flexible plastic material attached to the outer surface of the tubular member and overlying the discharge openings. The baffle is attached to the tube along a portion of its periphery and is detached along the remainder of the periphery in order to leave an opening through which the water may flow from the space between the tubular member and the baffle. While it is contemplated that a baffle member would ordinarily be an impervious member which allows the water to issue around the detached portions of its periphery, it is also possible to use a fluid-pervious member which is attached to the tubular member around its entire periphery since with a pervious member the water may issue slowly through the baffle member.

How the above objects of my invention are attained, as well as others not specifically mentioned herein, will be more readily understood by reference to the following description and to the annexed drawing, in which:

FIG. 1 is a plan view of an irrigating device constructed according to my invention.

FIG. 2 is a transverse section on line 2—2 of FIG. 1 at a larger scale.

FIG. 3 is a fragmentary perspective of a portion of an irrigating device constituting a variational form of my invention.

FIG. 4 is a fragmentary perspective of a portion of an irrigating device constituting another variational form of my invention.

FIG. 5 is a fragmentary perspective of a portion of an irrigating device constituting still another variational form of my invention.

FIG. 6 is a fragmentary perspective of a portion of an irrigating device constituting still another variational form of my invention.

FIG. 7 is a fragmentary perspective of a portion of an irrigating device constituting another variational form of my invention in which the baffle means is a pervious member.

Referring now to the drawing, there is shown in FIGS. 1 and 2 a presently preferred embodiment of my invention. In this form of the invention the irrigating device comprises a flexible tube 10 resembling a piece of ordinary garden hose and preferably made from a suitable one of the synthetic resins commonly referred to as plastics. The tubular member is open at one end in order to be connected to a source of water which enters and flows for the full length of the tube 10. This open end of the tube is preferably provided with a fitting 11 of any suitable type by means of which the device can be attached to a pipe, a garden hose, or another similar irrigating device. At the other end 12, the irrigation device is shown as being closed by sealing together the side walls of the tubular member 10. However it will be understood that, in accord with common practice in this art, the end 12 may be provided with a fitting of the type permitting connection of the irrigating device to another one so that two or more lengths may be connected in series. A fitting of this type may be closed by a removable cap when another length of tube is not attached.

As is shown best in FIG. 2, the tubular member 10 has a plurality of openings 14 in the wall of the tubular member, these openings serving as discharge openings through which the water leaves the tube 10. Since the soaker will ordinarily be several feet long, there will be need for several of these discharge openings 14. They are preferably arranged in two parallel rows on one side of the tube so that when the tube is resting on the ground on the other side, the holes 14 are upwardly disposed as shown in FIG. 2.

The construction so far described resembles a known type of sprinkler in which the water issuing through the opening 14 is in fine jets which spray outwardly and away from the tube 10 for several feet. In order to confine the area reached by these jets, the tube 10 is provided with baffle means 15 which is mounted on one side of the tubular member and so located as to intercept the streams of water issuing through the openings 14. After striking against the baffle member 15, the water runs off the baffle and onto the tube to the ground, reaching the ground only in the immediate vicinity of the soaker.

For obvious reasons, the baffle member 15 is preferably a flexible sheet of plastic material of the same type as that used to make the tube 10. The baffle means may be attached to the outer face of the tubular member by cement or by a seam formed by the application of heat and pressure, as is possible with certain types of plastics. The area over which the two members are connected to each other is designated as 16 in the drawings and is a narrow elongated area extending longitudinally of tube 10 and lying between the two rows of openings 14. Without any attachment to the tube in addition to the area 16, baffle 15 could become folded back in such a manner as to no longer cover one of the rows of openings 14. For this reason I prefer to tack down the baffle at suitable intervals along the length of tube 10 by adding short transverse seams 18 so that the baffle is in effect divided into sort bays, which are free from or detached from the tube along the outer edge thereof.

This arrangement allows the water issuing through a group of discharge openings 14 to strike the underside of baffle 15 and then flow down the outside of the tube between the baffle and the tube, falling onto the ground in the immediate vicinity of the tube.

An irrigation device of the type desired is most effective if there is no spray produced by impingement of the water streams on the baffle means. Several characteristics of the present device tend to reduce or eliminate the presence of such spray. In the first place, the soft, yielding nature of the plastic baffle minimizes production of spray, even at a realtively high velocity of water in each of the jets issuing from an opening 14. Furthermore, the baffle means being flexible, it normally drops down to a position in contact with or close to the tube. As a result there is only a small space between the two members and any spray produced tends to be trapped in this space. The baffle means does not necessarily assume any fixed or definite shape but it is generally characterized by being concave on its underside. As a result, any droplets or spray formed strike the baffle means as they spread out from the point of impingement and coalesce into a continuous water film or stream which flows out from the space between the tube or the baffle. Consequently the ground area watered is only that in the immediate vicinity of the irrigation device.

In the broadest aspect of my invention it is possible to make the tube and the baffle member from rigid material. For example, the tube might be a piece of ordinary cast iron pipe and the baffle could be a piece of sheet aluminum or tinned sheet steel suitably fastened to the pipe. However, such an arrangement has many disadvantages in use from the standpoint of domestic requirements and is also much more expensive to manufacture than the equivalent member made from flexible plastic.

FIG. 3 shows a variational form of my invention which differs only in that the tubular member 10a is provided with a central partition wall 20 so that the interior of the tubular member is divided into two parallel ducts, each with one row of openings 14.

Another variational embodiment of the invention is illustrated in FIG. 4 which differs from that in FIG. 2 in the means used to hold down the baffle member 15. In the form of the invention shown in FIG. 4, the transverse seams 18 are omitted and instead short cords 22 passing around the underside of the tube 10 at intervals are substituted. The ends of a cord are attached to the baffle member 15 near the outer edges thereof. If the cord is flexible, the weight of the baffle means will cause it to lie down in contact with the outer surface of tube 10, although for purposes of illustration the baffle means is shown in both FIGS. 2 and 4 as being elevated above this surface. However the baffle means can be held in this elevated position at all times, if desired, by making the member 22 rigid as by using a piece of metal wire.

A further variational embodiment of the invention is shown in FIG. 5 in which the tubular member 10b is shown as being rectangular in cross section. The water discharge openings 14b are now located in opposite side walls of the tubular member. In this form of the invention, the baffle means 15b is formed integrally with the tubular portion and consists of an extension at each side of the tubular member of the top wall thereof.

Each baffle member 15b may be integral with or attached at intervals to the tubular member along the lower edge of the baffle, leaving relatively long openings 24 through which water passes to reach the ground below. Depending upon the degree of rigidity imparted to the baffle members 15b at each side of the irrigation device, these points of connection may be made more or less frequent and actually may be omitted entirely in some cases since the configuration of the irrigation device and the force of gravity acting upon the outwardly extending baffles 15b all combine to hold the baffle means in position to intercept properly the streams of water issuing through the outlet orifices 14b.

FIG. 6 illustrates another embodiment of the invention. In this form of the invention the tubular member 10c is divided into two separate tubes or ducts 25. These ducts 25 are joined together in any suitable manner at one end into a single tubular member 10c to receive water at that end through coupling 11. Preferably the tubular member 10c is generally round in shape and at a point 27 removed from the end carrying fitting 11, the tube is divided into two half-round tubular members 25 each of which has a more or less flat wall 25a. Tubular member 10c is shown as a seamless member, but of course it may be assembled from a plurality of individually cast or extruded members joined together in any suitable manner.

The two walls 25a are each provided with a plurality of discharge openings 14c and are so arranged that the two walls oppose each other and are spaced a short distance apart. At intervals along the length of the tubular member the tubular ducts 25 are held in position with respect to each other by ties 26 which keep the two ducts from separating.

With this arrangement, the water discharged through the openings 14c in one tube 25 strikes against the wall 25a of the other tube so that each tube becomes a baffle means for the other tube. After striking the external surface of a wall 25a, the water flows out of the space between the two tubes to reach the ground in the vicinity of the tubular member 10c. Although the space between the two tubes 25 is shown as extending vertically in the drawing, the invention is not limited to this particular position and the soaker will work equally well with the ducts one above the other or in any random position since the water can always seep out from between the tubes 25; even though they are in contact with each other.

Control over the spacing between the two tubes is afforded by ties 26 which can be made of comparatively stiff material and can be placed at close intervals to insure, if desired, that the two members 25 are maintained spaced apart.

Another embodiment of the invention is shown in FIG. 7 in which the tubular member 10 is the same as previously illustrated in FIG. 2 and described in connection therewith but the baffle means in this case is a strip 30 of porous material, such as woven fabric, which is attached at marginal areas 31 along both its longitudinal edges to the sides of the tubular member. Because of the porous nature of the fabric used for baffle 30, the baffle is pervious to the water issuing through discharge openings 14 and it is not necessary, though optional, that the baffle means be detached from the tubular member at portions of the periphery of the baffle in order to allow the water to flow out from between the tube and baffle to reach the ground. Another difference in this form of the invention is that there is no need for a central point of attachment of the baffle to the tubular member as indicated at 16 in FIG. 1, the two marginal areas 31 being used instead.

From the foregoing description it will be understood that various changes in the shape and arrangement of the parts of an irrigating device may be made without departing from the spirit and scope of my invention. Accordingly it is to be understood that the foregoing description is considered to be illustrative of rather than limitative upon the invention as defined by the appended claims.

I claim:
1. A portable surface irrigation device comprising, an elongate, tubular member of flexible material open at one end to receive water and closed at the other end, said tubular member being of non-circular cross-section and having generally flat top and bottom wall portions, said bottom wall providing a base on which the tubular member rests to establish a given orientation of the member relative to the ground and the top wall being provided with a parallel spaced series of water-discharge openings permitting divergent flow of the water therefrom, a baffle secured longitudinally and coextensively of the top wall portion between said spaced series of discharge openings, said baffle also being secured transversely of said top wall at predetermined spaced areas between the serially arrayed water-discharge openings, whereby water issuing from the openings is deflected downwardly and outwardly from said elongate tubular member to a restricted area.

2. A portable surface irrigation device as claimed in claim 1, wherein the divergent areas of said baffle are held by a rigid means which extends beneath said bottom wall portion of said elongate tubular member.

References Cited in the file of this patent
UNITED STATES PATENTS

| | | |
|---|---|---|
| 460,352 | Reading | Sept. 29, 1891 |
| 953,080 | Wiggins | Mar. 29, 1910 |
| 963,354 | Braemer | July 5, 1910 |
| 2,566,833 | Healy | Sept. 4, 1951 |
| 2,743,960 | Kamin | May 1, 1956 |
| 2,771,320 | Korwin | Nov. 20, 1956 |
| 2,775,773 | Marsh | Jan. 1, 1957 |
| 2,851,306 | Huffaker | Sept. 9, 1958 |

FOREIGN PATENTS

| | | |
|---|---|---|
| 922,745 | Germany | Jan. 24, 1955 |